(12) United States Patent
Erdmann et al.

(10) Patent No.: US 10,116,501 B2
(45) Date of Patent: Oct. 30, 2018

(54) METHOD AND APPARATUS FOR INTER-PROFILE COMMISSIONING IN A NETWORK

(71) Applicant: PHILIPS LIGHTING HOLDING B.V., Eindhoven (NL)

(72) Inventors: Bozena Erdmann, Aachen (DE); Teresa Zotti, Aachen (DE); Philip Anthony Jamieson, Horley (GB)

(73) Assignee: PHILIPS LIGHTING HOLDING B.V., Eindhoven (NL)

( * ) Notice: Subject to any disclaimer, the term of this patent is extended or adjusted under 35 U.S.C. 154(b) by 66 days.

(21) Appl. No.: 15/027,153

(22) PCT Filed: Oct. 1, 2014

(86) PCT No.: PCT/EP2014/070996
§ 371 (c)(1),
(2) Date: Apr. 4, 2016

(87) PCT Pub. No.: WO2015/049259
PCT Pub. Date: Apr. 9, 2015

(65) Prior Publication Data
US 2016/0248629 A1    Aug. 25, 2016

(30) Foreign Application Priority Data

Oct. 4, 2013 (EP) ..................... 13187449
Feb. 17, 2014 (EP) ..................... 14155462

(51) Int. Cl.
*H04L 12/28* (2006.01)
*H04L 12/24* (2006.01)
(Continued)

(52) U.S. Cl.
CPC ........ *H04L 41/0806* (2013.01); *H04L 41/084* (2013.01); *H04L 41/0859* (2013.01);
(Continued)

(58) Field of Classification Search
CPC ..... H04W 24/02; H04W 12/08; H04W 84/18; H04W 84/12; H04L 41/0806; H04L 41/0859; H04L 67/303; H04L 41/084
(Continued)

(56) References Cited

U.S. PATENT DOCUMENTS

2005/0147071 A1   7/2005  Karaoguz et al.
2006/0046692 A1*  3/2006  Jelinek ................ H04L 63/0492
                                                            455/411
(Continued)

FOREIGN PATENT DOCUMENTS

WO    2010143130 A1   12/2010

OTHER PUBLICATIONS

Jung, Markus, et al., "A Transparent IPv6 Multi-Protocol Gateway to Integrate Building Automation Systems in the Internet of Things," 2012 IEEE International Conference on Green Computing and Communications, Conference on Internet of Things, and Conference on Cyber, Physical and Social Computing, 2012 (9 Pages).

*Primary Examiner* — Mang Yeung
(74) *Attorney, Agent, or Firm* — Meenakshy Chakravorty

(57) ABSTRACT

Inter-profile commissioning method and apparatus for a network The invention relates to a commissioning apparatus (130, 140) and method for configuring a joining node (150) of a first profile for operation in a network in accordance with a second profile, wherein the commissioning apparatus (130, 140) is arranged to emulate a commissioning process corresponding to the first profile.

14 Claims, 10 Drawing Sheets

(51) Int. Cl.
  *H04W 24/02* (2009.01)
  *H04L 29/08* (2006.01)
  *H04W 12/08* (2009.01)
  *H04W 84/18* (2009.01)
  *H04W 84/12* (2009.01)

(52) U.S. Cl.
  CPC ........... H04L 67/303 (2013.01); H04W 12/08 (2013.01); H04W 24/02 (2013.01); *H04W 84/12* (2013.01); *H04W 84/18* (2013.01)

(58) Field of Classification Search
  USPC ........................................................ 370/254
  See application file for complete search history.

(56) References Cited

U.S. PATENT DOCUMENTS

| | | | | |
|---|---|---|---|---|
| 2009/0016325 A1* | 1/2009 | Al-Bakri | ........... | H04L 29/06027 370/352 |
| 2009/0177889 A1* | 7/2009 | Sung | .................... | H04L 63/061 713/171 |
| 2012/0176986 A1* | 7/2012 | Rudland | ............ | H04W 40/248 370/329 |
| 2013/0191755 A1 | 7/2013 | Balog et al. | | |
| 2015/0113052 A1* | 4/2015 | Chen | ....................... | H04L 67/16 709/203 |

\* cited by examiner

METHOD AND APPARATUS FOR INTER-PROFILE COMMISSIONING IN A NETWORK

CROSS-REFERENCE TO PRIOR APPLICATIONS

This application is the U.S. National Phase application under 35 U.S.C. § 371 of International Application No. PCT/EP2014/070996, filed on Oct. 1, 2014, which claims the benefit of European Patent Application No. 13187449.7, filed on Oct. 4, 2013 and European Patent Application No. 14155462.6, filed on Feb. 17, 2014. These applications are hereby incorporated by reference herein.

FIELD OF THE INVENTION

This invention relates to the field of a method of commissioning, an apparatus for commissioning a node in a network, and a network comprising such a device. In particular, such a device may be able to commission nodes using different protocol profiles, each protocol profile requiring a corresponding commissioning scheme. For example, the topology of the network (centralised/distributed) depends on the protocol profiles of the node, thus the commissioning needs to be adapted to the differences in protocol profiles.

BACKGROUND OF THE INVENTION

Home and building automation makes use of wireless networks. Over the past years, numerous types of networks have been proposed and are being used. As an example, ZigBee is a low-cost, low-power, wireless mesh network standard. The low cost allows the technology to be widely deployed in wireless control and monitoring applications. Low power usage allows longer life with smaller batteries. ZigBee is based on the IEEE 802.15.4 standard. Though low-powered, ZigBee devices often transmit data over longer distances by passing data through intermediate devices to reach more distant ones, creating a mesh network (i.e., a network with no high-power transmitter/receiver able to reach all of the networked devices). The decentralized nature of such wireless ad hoc networks makes them suitable for applications where a central node can't be relied upon.

In order for applications to communicate, they must be able to join the same network, i.e. get configured with network operational parameters, e.g. network identifier, operational channel, security key, etc. The mandatory or optional methods to exchange those parameters, also referred to as commissioning (procedure(s)), are defined in so-called application profiles. Furthermore, binding, i.e. application level control relationship, telling one device that its control data is to be sent to another device and/or that it shall accept control data from another device, is decided upon by matching input and output cluster identifiers, associated to an incoming or outgoing data flow in a device. Binding tables contain source and destination pairs. ZigBee is available as two feature sets, ZigBee PRO and ZigBee and they define how ZigBee mesh networks operate. ZigBee PRO, the most widely used specification, is optimized for low power consumption and to support large networks with thousands of devices. ZigBee PRO proposes several application profiles that could coexist in the same area. However, at the moment, there are some incompatibilities which prevent nodes from different profiles to form a single network.

Two of the several ZigBee public application profiles will be discussed here in more detail, because they compete for the same market space: the consumer market. ZigBee Home Automation (ZHA) is an industry global standard helping to create smarter homes that enhance the comfort, convenience, security and energy management for the consumer. Furthermore, ZigBee Light Link (ZLL) gives the lighting industry a global standard for interoperable and very easy-to-use consumer lighting and control products. It allows consumers to gain wireless control over all their LED fixtures, light bulbs, via timers, remotes and switches. An emblematic non-interoperability case is represented by ZHA profile and ZLL profile devices. The main difference here is the different nature of the profiles involved. Namely, ZHA is built around a central coordinator, centrally managing the network joining process, while ZLL devices can operate in a distributed network taking advantage of a so-called "Touchlink" mechanism to locally add components and manage the lighting network.

The task of configuring devices and networks to achieve the needs of the specific installation is known as commissioning. In its broadest sense, commissioning encompasses a wide range of tasks, including a survey of the radio and physical environment, the placement of devices, configuration of parameters, application binding, optimization of network and device parameters, and testing and verification of correct operation. Often, non- and semi-technical issues need to be considered, including the skills and workflow practices of the installer, ease of identification and accessibility of devices, and interoperability and coexistence with other wireless or wired systems. While consideration for commissioning is often focused on the installer, the ability to easily configure and commission ZigBee systems during development and testing, as well as field trials, can also significantly speed up the development and product delivery to market. Moreover, ease of commissioning is also important for the do-it-yourself consumer market.

More specifically, the commissioning process may involve a number of steps, comprising network creation, joining/discovery of an active network, address assignment, security key exchange, finding and binding between devices, and application layer configuration (e.g. of reporting intervals, etc.).

Three different commissioning modes are typically discussed with in the ZigBee Alliance. The first, A-mode (automatic mode), involves automatic commissioning of devices. The A-mode generally allows for minimal (or no) human intervention. The second, E-mode (easy mode), involves the use of buttons or other physical mechanisms on devices to direct devices during commissioning. The E-mode allows for simple end-user or professional installer commissioning. It usually targets small installations (size: typical home). The third, S-mode (system mode), involves the use of external tools and is typically used by expert installers. The S-mode represents the most complex form of commissioning and includes the highest level of human intervention. It usually targets larger installations such as commercial premises and high-end residential environments. Furthermore, the S-mode is a centralized commissioning which is a means for a (central) device to perform or control or influence commissioning on/of other devices. This type of commissioning is also being referred to as Gateway-, or Tool-commissioning. The central device can be a gateway, a home controller or a commissioning tool that is typically connected to a graphical user interface. It is able to configure bindings and reporting on other devices in the network. The central device is not required to perform ZigBee Coordinator role. In fact, it can be a ZigBee Router as well. The device in a ZHA network with this functionality is defined as Commissioning Director (CD).

Current specifications for ZHA profiles define two different main commissioning modes, namely EZ-mode commissioning (e.g. push button commissioning) and centralized commissioning (e.g., aka Gateway, Tool or S-mode Commissioning), wherein EZ-Mode and centralized commissioning are complementary and fully compatible.

In the same vein, the ZLL profile specification (as disclosed in docs-zll-zigbee-light-link-zll-profile-specification, ZigBee document number 11-0037) provides as preferred commissioning mechanism a Touchlink (TL) commissioning. The ZLL system benefits from a simplified installation method in order to appeal to the consumer market. Touchlink minimizes user participation, allowing off-the-shelf products to be quickly and easily installed by the consumer. The security model of Touchlink requires physical proximity between the devices which shall Touchlink together, thus assisting network discovery and selection. It also is best suited for devices with very limited or no (physical) user interface (UI) means, since on ZLL target the Touchlink is not required to be triggered by other means than the over-the-air exchange (in proximity). Touchlink removes the need for a ZigBee Coordinator in the network formation and join processes. The method uses a special commissioning application (based on a ZLL commissioning cluster) which is run on the nodes, and utilizes the Inter Personal Area Network (Inter-PAN) frames, allowing for information exchange between devices not yet operational on the same network. The node that initiates the network formation/join operation is known as the 'initiator'—this node will often be a remote control unit but could be another node, e.g. a switch, a sensor or even a lamp. Touchlink simply requires the initiator node to be brought close to the node to be included in the network and the commissioning to be started (e.g. by pressing a button). The node that is contacted by the initiator to perform a network formation or join operation is known as the 'target'.

Current ZigBee specifications describe for each public application profile the detailed steps needed for a non-connected device to reach its normal operational state. Considering the number and complexity of tasks generally involved in the commissioning phase, it is easy to see the value of a single commissioning tool to set up devices belonging to different ZigBee public application profiles.

Since each ZigBee public application profile has been conceived for addressing different needs and scenarios, the respective existing commissioning procedures present some differences that do not allow devices belonging to different profiles to communicate to each other.

Today, the step related to the creation of the network, in case of a factory new device, presents a relevant issue for both profiles. ZLL target devices need to communicate with an initiator which guarantees the distributed network inception via Inter-PAN based commands, while ZHA devices—for the same task—rely on the presence of a central coordinator, absent in the ZLL network topology. For these reasons, the current commissioning procedures are not applicable in any context in which a ZLL router wants to have control over a ZHA end device and vice versa, especially if both devices are non-connected yet and a network is absence.

The main consequence of these gaps is that currently available commissioning tools can only be used to set up a system in which all the devices belong to the same ZigBee public profile.

In the ZigBee Building Automation application profile specifications, a commissioning tool is defined, which may have the ability to create its own temporary commissioning network, pull the joiner to that, and instruct the joiner to join another network subsequently. However, all these functionalities require the joiner to implement the ZCL commissioning cluster.

SUMMARY OF THE INVENTION

It is an object of the invention to propose a commissioning method and device which enable commissioning of different nodes having different respective profiles, and different commissioning procedures specified by the profiles, and thus allows for fully addressing legacy devices implemented according to those profiles.

This object is achieved by an apparatus according to claim 1, a method according to claim 13, a network device according to claim 14 and a computer program product according to claim 15.

Accordingly, a new commissioning apparatus (provided e.g. as a commissioning tool or a commissioning device) or function is provided in the network so as to enable emulating a type of network corresponding to a joining node profile. This approach allows customers to quickly set up and control devices belonging to different application profiles (e.g. ZHA or ZLL), which therefore do not have to support a common commissioning procedure. Thereby, ZHA devices can control ZLL devices (and vice versa) because the proposed commissioning tool or function provides a translation or bridge between ZLL commissioning (e.g. Touchlink) and ZHA commissioning (e.g. EZ mode).

The proposed commissioning apparatus or function in accordance is capable of acting as a particular network type towards a joiner or joining node, even if the network is in fact of a different type. E.g., it can pretend to be a centralized network, for the legacy ZHA joiners attempting to join a ZLL network. In other words, the commissioning apparatus or function emulates a network type in case the current network type is not corresponding to the joining node's profile.

While it is an advantage to be able to implement or realize the commissioning apparatus or function as or in a simple device (e.g. like a remote control (RC)), the present invention is not limited to such a realisation, and can include rich user interface handheld devices, and bridge or gateway like device. The gateway may operate as a bridge between the commissioned network and another type of networks, for example, local area networks (LANs) or wireless LANs (WLANs).

Depending on its realisation, the commissioning apparatus or function can perform all or parts of the functionality specified here. Also, the user model may change: e.g., for the touchlink exchange, rather than bringing the RC-type commissioning apparatus or function to the joiner, the joiner may need to be put in proximity of a gateway/bridge-type commissioning apparatus or function. Unless explicitly specified otherwise, the abbreviation "CT", which stands for Commissioning Tool, is used to indicate any of those realisations in the following description of embodiments.

While only two ZigBee profiles (ZHA and ZLL) are mentioned explicitly, the apparatus or function may further accommodate for devices of any ZigBee profiles, incl. ZHA, ZLL, ZBA, ZRS, ZTS, ZHC, and ZSE.

The purpose of the proposed solution is to provide a unique commissioning tool able to overcome the above mentioned differences that today prevent the communication between devices of different network profiles (e.g. ZigBee profiles). For the specific example of the consumer networks, which may consist of both ZLL and ZHA devices, the commissioning apparatus or function can be seen as a commissioning-time bridge device (intermediary) addressing a double task. Namely, it simulates the role of coordinator or parent device for all those devices that rely on its presence (e.g. ZHA) and, at the same time, is able to perform Inter-PAN communications between those devices that are conceived for and/or use Touchlink commissioning.

According to a first option, the first profile may be selected based on at least one of the following: a user selection, detection, abilities of the joining node discovered by the commissioning apparatus. This allows flexible implementation of the commissioning apparatus or function in accordance with desired user applications.

According to a second option which may be combined with the first option, the apparatus may be arranged for attempting a plurality of supported commissioning methods in a predetermined order. This measure ensures that all available commissioning options are tried and a prioritization can be implemented.

According to a third option which may be combined with the first or second option, the apparatus may be adapted to allow ZigBee Light Link (ZLL) devices to join according to a Touchlink commissioning process, wherein the apparatus may further be adapted to operate as an initiator, and if operating on a centralized network, to copy centralized network parameters and to reinterpret them within a ZLL commissioning cluster command, and wherein the apparatus may further comprise a transmitter for transmitting to a trust center device information about the joining device, for asking the trust center device for approval prior to sending the centralized network parameters or a network key to the joiner. Thereby, the commissioning apparatus acts as bridge or an intermediary between centralized and non-centralized network profiles.

According to a fourth option which may be combined with any of the first to third option, the apparatus may be adapted to translate ZigBee Light Link Touchlink communication into ZigBee classical commissioning communication. Here, the commissioning apparatus provides a simple translation function to enable communication between ZLL and ZHA devices.

According to a fifth option which may be combined with any of the first to fourth option, the apparatus may be adapted to, if operating on a distributed network, pretend to be a coordinator on a centralized network and to deliver a network key protected in a way expected by a ZigBee classical device. This option allow joining of legacy ZHA devices to a distributed ZHA network.

According to a sixth option which may be combined with any of the first to fifth option, the apparatus may further comprise a processor for translating requests or responses of the joining node from a protocol of the first profile to a protocol of the second profile protocol or for generating requests or responses based on information obtained before. The processor enables flexible programming of the commissioning apparatus so as to provide a multi-purpose commissioning tool, it also allows the tool to process the events on the fly and respond accordingly.

According to a seventh option which may be combined with any of the first to sixth option, the apparatus may be adapted to provide a first functionality as an initiator for devices of the first profile and a second functionality as a coordinator for devices of the second profile. This measure enables adaptation between centralized networks and non-centralized network profiles.

According to an eighth option which may be combined with any of the first to seventh option, the apparatus may be adapted to determine capabilities of the joining node and to select an appropriate commissioning method based on the result of determination. Thereby, network load can be reduced, since information exchange between the joining node and the commissioning apparatus can be minimized. In a specific example, the apparatus may be adapted to determine a security key based on the result of determination. Thus, the network security may be maximized, by selecting the most secure commissioning procedure and settings of those supported by the network/tool and the joiner.

According to a ninth option which may be combined with any of the first to eighth option, the apparatus may be adapted to instruct a router device to join or rejoin the network by stopping to send any replies to the joining node. Thereby, the joining node can be triggered to change its parent device of the network.

According to a tenth option which may be combined with any of the first to ninth option, the apparatus may be adapted to collect and optionally store information about devices of the network in an internal data structure. This measure is beneficial if the devices are not always available for communication or if a Touchlink device gets out of the touchlinking proximity range; the storing is especially beneficial if a commissioning procedure has a strict timeouts, as a whole or for particular steps, so that no time may be available for real time discovery.

According to an eleventh option which may be combined with any of the first to tenth option, the apparatus may adapted to perform at least one of unicasting a simple descriptor request ZDO command, of providing discovery information of other devices upon reception of a simple descriptor request command from a local device, of broadcasting an identify query command, of handling an identify query response from an endpoint, of notifying to other nodes in the network about the successful joining of a new device, of notifying a trust center in the network about information capability of a device that has joined the network by means of Touchlink commissioning, of processing a re-join request command and issuing a re-join response command for allowing re-association of devices which lost connectivity to the network or join the network for the first time after being configured with the network parameters, of notifying the user about successful or unsuccessful accomplishment of a commissioning operation, and of keeping track of a modality used to commission a device and maintaining this information for allowing an easier re-join procedure in case of connectivity loss or network parameter change. These abilities allow an efficient emulation of the type of network corresponding to a joining node profile.

It is to be noted that the commissioning apparatus may be implemented based on discrete hardware circuitry with discrete hardware components, an integrated chip, or an arrangement of chip modules, or based on a signal processing device or chip controlled by a software routine or program stored in a memory, written on a computer readable medium, or downloaded from a network, such as the Internet.

It shall be understood that the apparatus of claim 1, the method of claim 13, the device of claim 14 and the computer program of claim 15 have similar and/or identical preferred embodiments, in particular, as defined in the dependent claims.

It shall be understood that a preferred embodiment of the invention can also be any combination of the dependent claims or above embodiments with the respective independent claim.

These and other aspects of the invention will be apparent from and elucidated with reference to the embodiments described hereinafter.

DETAILED DESCRIPTION OF THE INVENTION

Figure 1:
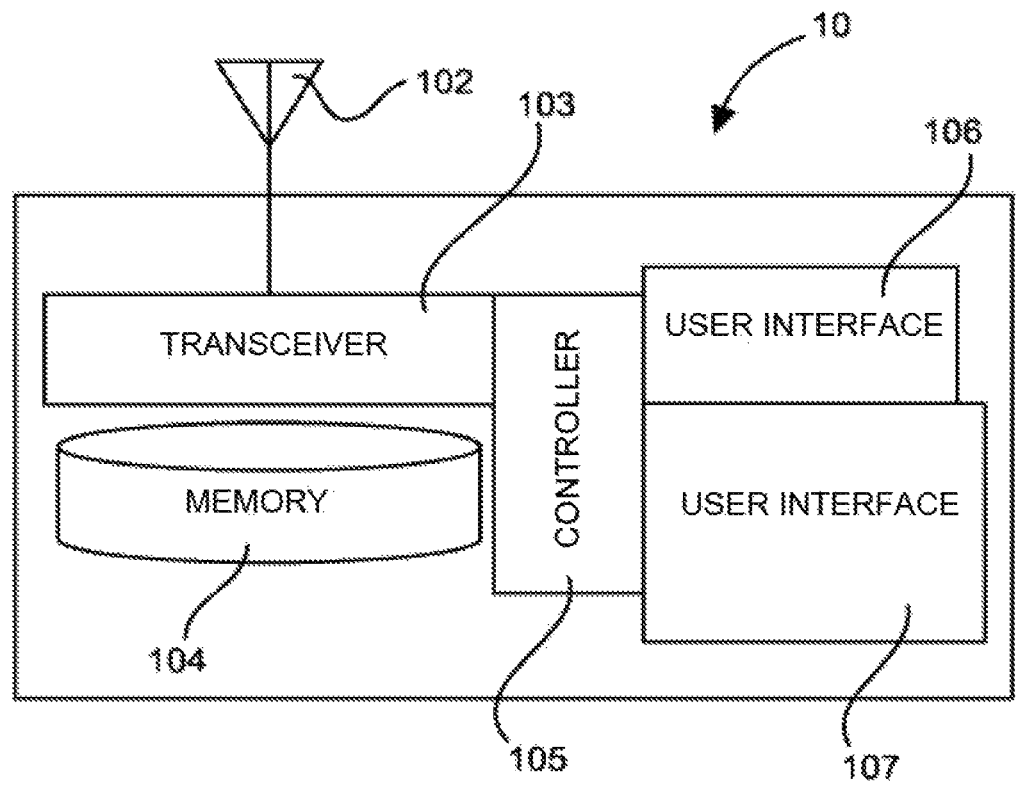
FIG. 1 shows a schematic block diagram of a commissioning device in which the present invention can be implemented.

Embodiments of the present invention are now described based on a commissioning tool for a wireless sensor network or a home or building automation network. In particular, the examples introduced and explicated below are based on ZigBee wireless networks. Such networks may be related to home or building automation networks where several profiles may coexist and need to interact. For example, ZigBee Light Link (ZLL) and ZigBee Home Automation (ZHA) nodes may need to operate together in particular at the formation of a network. It is to be noted that ZigBee networks are used here as an example and the invention could apply to further kinds of wireless networks for home and building automation or sensing or monitoring.

Before proceeding with the description of the embodiments and their respective commissioning procedures, variables that will play a fundamental role in the network inception phase for the ZigBee system are presented and explained. The table below summarizes such variables or parameters already defined by the ZigBee specifications, listing first the generic designation of each of the parameters and then its realization in ZigBee systems, including the range of values (in hexadecimal notation) it may assume and its default value (in hexadecimal notation) in a factory-new device.

| Parameter type | ZigBee specific variable | Field name | Data type | Range | Default value |
|---|---|---|---|---|---|
| Node identifier | NA | Network address | unsigned 16-bit address | 0x0000-0xffff | 0xffff |
| Network identifier | PID | PAN identifier | unsigned 16-bit address | 0x0000-0xffff | 0xffff |
| | EPID | Extended PAN identifier | IEEE address | 0x00-0xff [x8] | 0x00[x8] |
| | NUI | Network update identifier | integer | 0x00-0xFF | 0x00 |
| Radio channel | LC | Logical channel | unsigned 8-bit integer | 0-26 | 0x00 |
| Security settings | SNK | Security network key | set of 0, 1 or 2 network security material descriptors | Variable | — |
| | SNKID | Key identifier | unsigned 8-bit integer | 0x00-0xff | 0x00 |
| | TC | Trust Centre address | IEEE address | 0x00-0xff [x8] | 0x00[x8] |
| Device | CC | Coordinator | Boolean | „false"/"true" | As |

-continued

| Parameter type | ZigBee specific variable | Field name | Data type | Range | Default value |
|---|---|---|---|---|---|
| commissioning capabilities | LDT | capable Logical device type | unsigned 8-bit integer | ZC, ZR, ZED | appropriate As appropriate |

The function of the above parameters is now briefly explained:

The network address (NA) field is 16-bits in length and shall contain the short network address assigned to a wireless node/controller.

The Personal Area Network (PAN) identifier field (PID) is 16-bits in length and shall contain the identifier of a PAN.

The extended PAN identifier (EPID) field is 64-bits in length and shall contain the extended PAN identifier of the network.

The logical channel field (LC) (named as "phyCurrentChannel") is 8-bits in length and shall contain the radio channel to be used for the network.

The network update identifier (NUI) field shall contain the value identifying a snapshot of the network settings this node is operating with.

The security network key (SNK) set contains the network keying material, which should be accessible to commissioning applications.

The key identifier (SNKID) contains the sequence number of the active network key in the security network key set.

The coordinator capable (CC) field is a Boolean flag and shall inform about the capability of the device of being able to play the role of a coordinator in the network (i.e. possibility to create a new network, optionally/including acting as a Trust Centre point). If the CC flag is set to true, the device is capable of being a coordinator. If the CC flag is set to false, the device can be a ZigBee router or ZigBee end device type. This flag is named "nwkcCoordinatorCapable" is present in current ZigBee specifications as a Network Information Base (NIB) constant. A second flag (named "apsDesignatedCoordinator") is present in current ZigBee specifications as APS information base (AIB) constant. The Alternate PAN Coordinator flag of the MAC (Media Access Control) Capability Flags field of the node descriptor is set to "0b0" by the current ZigBee specification (r20).

The logical device type (LDT) field is 8-bits in length and specifies the type of the device, e.g., if the device is a ZigBee router, a ZigBee coordinator or a ZigBee end device. It is implemented as a logical type field of the Node Descriptor.

In the following, possible hardware components of the proposed commissioning tool (CT) are described.

FIG. 1 shows a schematic block diagram of a CT 10 according to various embodiments. The CT 10 comprises a transceiver 103 for wirelessly transmitting/receiving information to/from the network via an antenna 102. Furthermore, a memory 104 and a controller 105 is provided for storing and processing information required for implementing commissioning procedures according to the embodiments described below. Signals may be output to a user via a first user interface 106 (e.g. a buzzer or light emitting element or screen etc.), and a user may input information via a second user interface 107 (e.g. button(s) or touchscreen etc.).

Figure 2:
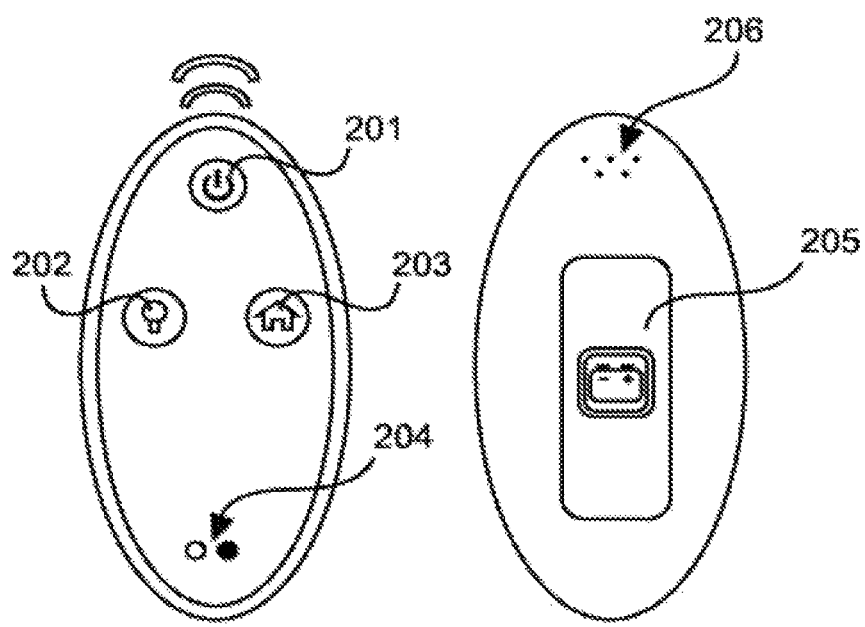
FIG. 2 shows a schematic example of a possible realization of the commissioning device as a remote control.

FIG. 2 shows a schematic example of a possible realization of the commissioning device as a handheld device with remote control function. An on/off button 201 serves to switch on or off the device. Additionally, a Touchlink button 202 may be provided for commissioning devices supporting the Touchlink procedure, and an EZ-mode button 203 for commissioning of ZHA devices. Light emitting diodes (LEDs) 204 or other lighting elements or a buzzer 206 are provided as output user interface (UI) elements. The device may be powered by a battery inserted to a battery slot 205. The buttons 202, 203 can be combined. The LEDs 204 and the buzzer 206 are examples of output UI means, and can also be combined, or replaced by other output means, e.g. a display.

To provide a detailed description of the commissioning procedures according to various embodiments that the proposed commissioning tool may implement, four main sub-sections are addressed, namely creation/joining/discovery/selection of a network (start-up procedure), security key exchange, allowing joining of new devices, and finding and binding.

The creation/joining/discovery/selection of a network (start-up procedure) is a procedure immediately after a power-up phase of a factory new CT and describes through which steps the device may become active part of an existing network or creating a new network in case no network has been detected.

It is to be noted that there may be different philosophies possible, regarding data retention in the CT for subsequent power-ups. In a home-like CT, upon a subsequent power-up, the CT may already be in a network (because it is likely to always be used to configure the same home network). Thus, it may retain the data in its memory. By contrast, in a professional-like CT, the CT may be used to configure different networks, so upon power up it has not joined yet and joins/creates the network it needs (or e.g. downloads one of the many configurations from its memory).

Thus, the below commissioning procedures according to various embodiments may be applicable to a factory-new CT or a CT (re-)joining (another) network.

The CT is powered up (e.g. batteries inserted, device is switched on or commissioning app (e.g. applet or application) is started. Upon user interaction (or automatically) the CT performs actions necessary for network discovery and then joining (and/or formation), using any required method (classical, joining, EZ-Mode, Touchlink or any other joining method, if supported).

If the CT detects a suitable network to join, the CT may join a centralized network or a distributed network. A suitable network to join is a network fulfilling some implementation-specific criteria of the CT, for example including: open for joining (PermitJoin-TRUE), capable of accepting devices of particular type, operating according to a particular profile, performing a particular commissioning method, requiring a particular type of security credentials, operating according to particular security settings, including a particular device type (e.g. gateway), having a particular signal quality, etc.

In case of classical joining or EZ-Mode, the network type (centralized or distributed) can be determined when receiving the security key (in a transport key command) after joining, by analysing the TC address field which includes "0xff . . . ff" in case of distributed network and a unique address (not "0xff . . . ff" and not "0x00 . . . 00") in case of a centralized network with a coordinator, because the coordinator typically also hosts the trust center (TC) function. The use of the Touchlink method likely indicates a distributed network.

If the joining is successful, the CT is active part of the network and can now be used for commissioning other devices and allowing them to join the network.

As indicated above, optionally, the CT can recall network parameters from its memory, and do a NWK rejoin or silent rejoin.

If no suitable network has been detected, the commissioning tool sets the initial parameters of the network: PAN ID, Extended PAN ID, Network Address 0x0000 and security settings (TC address !="0xff . . . ff") and creates a network as a coordinator). In another embodiment, if no network has been detected, the CT may form a distributed network. In yet another embodiment, if no suitable network has been detected, the commissioning tool may wait for determining the network type until preforming the actual commissioning procedure (e.g. based on user input or joiner capabilities).

After the CT is active in a network or it has created one (as a coordinator), it has finally the capability to commission and to allow other devices to join the network.

In the following embodiments, different commissioning procedures for different start-up cases are described based on FIGS. 3 to 6.

Figure 3:
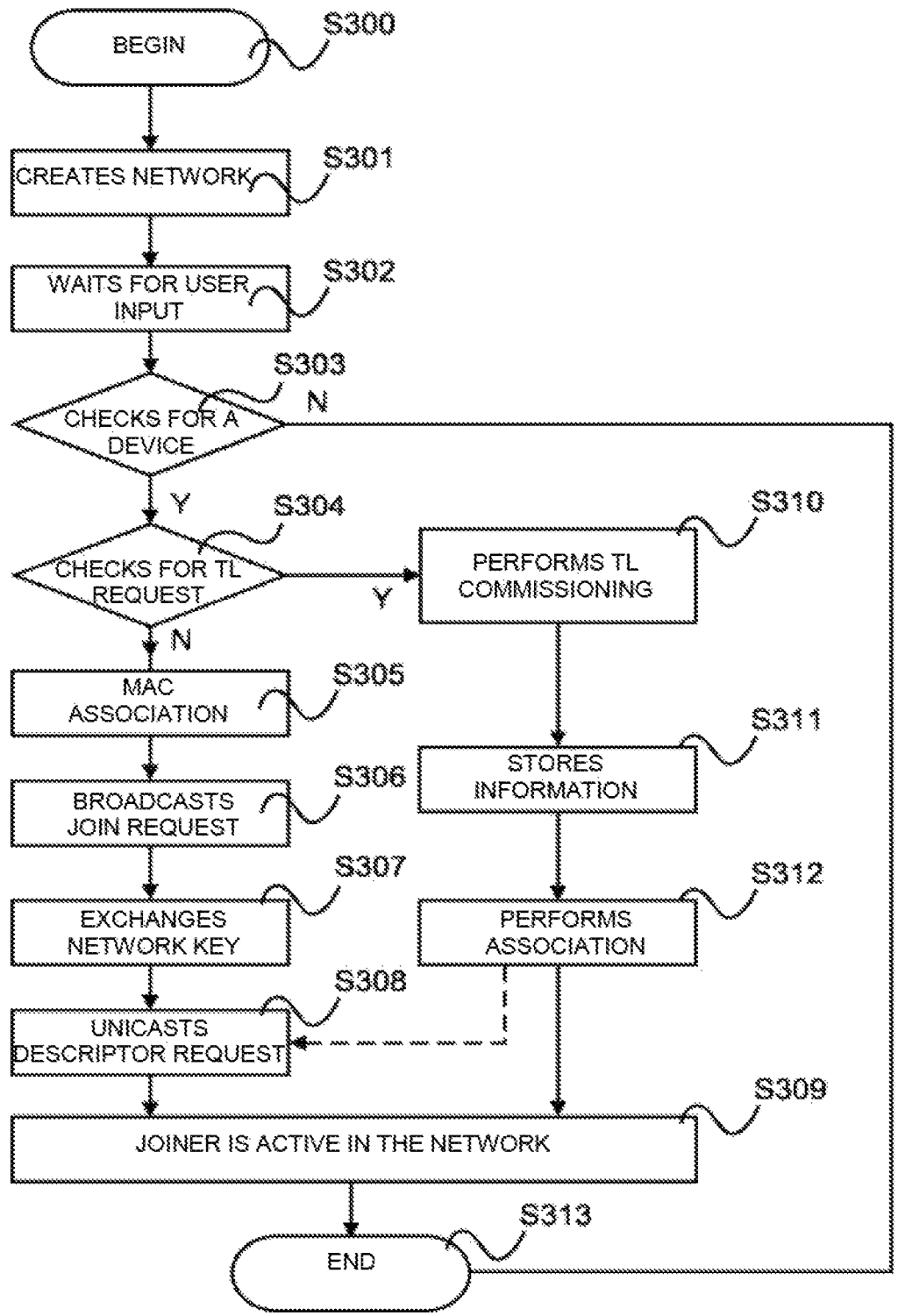
FIG. 3 shows a flow diagram of a commissioning procedure according to a first embodiment where no existing network has been detected, a commissioning tool has created a network as a coordinator and a new device wants to join the network.

FIG. 3 shows a flow diagram of a commissioning procedure according to a first embodiment where no suitable network has been detected, the CT has created a network as a coordinator and a new device wants to join the network.

Here, the CT plays a double role of initiator for ZLL devices and of ZigBee PAN Coordinator (ZC) and/or Trust Centre (TC) for ZHA devices. The first embodiment described in FIG. 3 (representing only one of a plurality of possible options) refers to a CT as ZLL initiator. In order to trigger the Touchlink procedure in this particular case the user interaction is needed.

The procedure begins at step S300. At step S301, the CT has created a network as a coordinator and at step S302 it waits for (user) input. Please note, that a network at this step may already contain additional devices, which joined previously at the CT or via any other commissioning way. In extension, if any of the other devices in CT's network are capable of performing the ZC/TC role, the CT may pass over this role to that device, thus effectively moving to the case of FIG. 4 below. In S302, the CT may participate in any communication exchange on the network, e.g. control other devices, receive control commands, receive an/or send maintenance data, etc.

At step S303, after a trigger (e.g. user action) for enabling commissioning, a pre-determined time window for commissioning is opened and the CT checks for a device to join (e.g. by active scan on the ZLL primary channels, where FN ZLL target is required to be). If no device tries to join the network and the time window elapsed, the procedure jumps to its end at step S313. In one embodiment (which can be realized e.g. in a remote control, as depicted e.g. in FIG. 2 above), the user may explicitly trigger the CT to perform a particular type of commissioning, e.g. Touchlink commissioning rather than classical joining/EZ-Mode commissioning, e.g. using two different user interactions, e.g. two buttons or two press sequences (e.g. short vs. long press, one press vs. two presses, etc.). In another embodiment, there may be just a single user trigger at the CT, and the CT may be programmed to attempt both supported commissioning methods in a particular order, e.g. first act as ZLL initiator, scanning the primary channels for (factory-new) targets, and if no target is found (in the Touchlink-requested proximity), return to the operational channel and open PermitJoin; or vice versa, or interleave selected steps of both procedures. In yet another embodiment, the CT may be able to determine the capabilities of the joiner (e.g. by exchange of capability information between the joiner and the network), and—despite the single user trigger—may be able to directly start the appropriate method.

In step S304, the CT checks for a Touchlink request. If a Touchlink request is detected, the procedure continues with step S310, in which the CT performs Touchlink commissioning which includes transmitting the initial parameters, and the exchange of the network key secured with ZLL key. At an optional step S311, the CT stores the relevant information exchanged during the Touchlink procedure in its memory to allow binding. At step S312, the joiner can perform association or NWK-rejoin with the obtained parameters. Alternatively to this S310-S312 branch, the CT may allow the ZLL devices to join using classical joining, protecting the network key with the ZLL pre-installed certification link key.

In case no Touchlink request is detected in step S304 and classical joining request is received, the CT allows for MAC association in step S305. It is to be noted that the CT may need to be in PermitJoin=TRUE state. If there are other (router) devices in the network of the CT, the CT may broadcast a permit join request in step S306 and enable joining at another parent device. In this case, the CT may still participate in the commissioning exchange in its Trust Centre (TC) role.

At step S307, the exchange of the network key secured with the default TC-link key is performed. At an optional step S308, the CT may unicast a simple descriptor request (Simple_desc_req) to the new device in order to retrieve and store information for binding.

Finally, at step S309, the joiner is active in the network and the procedure ends at step S313.

Figure 4:
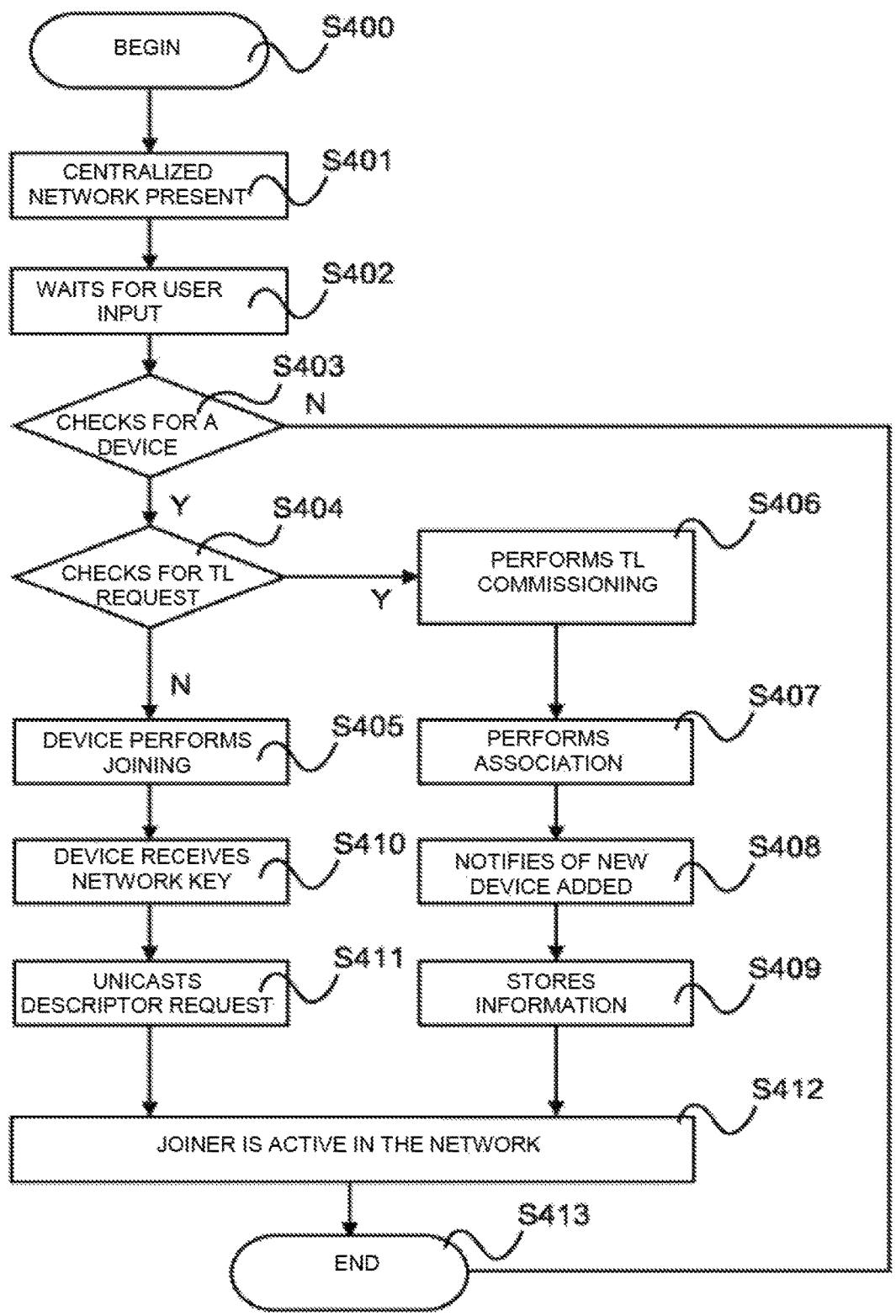
FIG. 4 shows a flow diagram of a commissioning procedure according to a second embodiment where the commissioning tool works within a centralized network and a new device wants to join the network.

FIG. 4 shows a flow diagram of a commissioning procedure according to a second embodiment where the commissioning tool works within a centralized network and a new device wants to join the network.

Here, the commissioning tool allows ZigBee Light Link devices to join according to the Touchlink modality, whereby the CT works as a ZLL initiator, copying the centralized network parameters and reinterpreting them within an Inter-PAN command. The CT will notify the TC about the new device which has joined the network.

In FIG. 4, the procedure begins at step S400 and starts with the presence of a centralized network in step S401, which the CT is part of. At step S402 the CT waits for (user) input; a network at this step may already contain additional devices, which joined previously at the CT or via any other commissioning way; furthermore, the CT may participate in any communication exchange on the network, e.g. control other devices, receive control commands, receive an/or send maintenance data, etc. At step S403, as for the case of FIG. 3 above, after a trigger (e.g. user action) for enabling commissioning, a pre-determined time window for commissioning is opened and the CT checks for a device to join (by active scan on the ZLL primary channels, where FN ZLL target is required to be). If no device tries to join the network and the time window elapsed the procedure ends at step S413. In one embodiment (which can be realized e.g. in a remote control, as depicted e.g. in FIG. 2 above), the user may explicitly trigger the CT to perform a particular type of commissioning, e.g. Touchlink commissioning rather than classical joining/EZ-Mode commissioning, e.g. using two different user interactions, e.g. two buttons or two press sequences (e.g. short vs. long press, one press vs. two presses, etc.). In another embodiment, there may be just a single user trigger at the CT, and the CT may be programmed to attempt both supported commissioning methods in a particular order, e.g. first act as ZLL initiator, scanning the primary channels for (factory-new) targets, and if none are found (in the Touchlink-requested proximity), return to the operational channel and open PermitJoin; or vice versa, or interleave selected steps of both procedures. In yet another embodiment, the CT may be able to determine the capabilities of the joiner (e.g. by exchange of capability information between the joiner and the network), and—despite the single user trigger—may be able to directly start the appropriate method.

In case a Touchlink request is detected in subsequent step S404, the CT performs Touchlink commissioning at step S406, wherein the CT copies the current network parameters (incl. the network key selected by the TC, protected by the ZLL master key) and transmits them to the new device via Touchlink (e.g. the touchlink network join router request/network join end device request command). Association or network rejoining is performed at step S407.

At step S408, the TC is notified about the addition of a new device in the network. In one embodiment, this is performed by the CT. It may just inform the ZC/TC about the new device (e.g. using a command like Update_device or Device_annce), it may also completely emulate the joining procedure on behalf of the new device, thus effectively enabling the ZC/TC to allow for or prevent providing the security key to the joiner. In another embodiment, the joiner device does it itself, after successfully joining the network. It is to be noted that for either of those embodiments, it may be required for the ZC/TC to be in commissioning mode, to accept the new device; this can be achieved e.g. by the CT sending PermitJoin=TRUE in broadcast or in unicast to the ZC/TC device, e.g. as part of the procedure of step S403, as part of step S406, or as part of the procedure at step S408.

In extension, the joiner may be configured with the true identity of the TC (replacing the default TC address "0xff . . . ff" implied by the Touchlink procedure). This may be important in case classical joining may need to be used, and the joiner device may be a parent device in the future, i.e., if the joiner device is a ZigBee router and the user uses different commissioning modalities, e.g. sometimes performing the commissioning with the CT, and sometimes enabling the commissioning from a central device, e.g. ZC/TC or a gateway. In one implementation, the Touchlink commands exchanged at step S406 can be extended, to carry the TC address. In another embodiment, the TC address can be delivered after joining, by CT or TC/ZC, e.g. using the transport key command, or directly writing into an apsTrustCenterAddress parameter.

At the optional step S409, the CT stores the relevant information exchanged during the Touchlink procedure in its memory to allow binding.

At step S412, the joiner is active in the network and the procedure ends at step S413.

If at step S404 no Touchlink request is detected, most likely the joining device is a ZHA device which at a subsequent step S405 performs joining according to current ZigBee specifications. For this, the CT may need to enable PermitJoin, locally or in the entire network, e.g. as part of step S405. At the following step S410, the joiner receives the network key (protected by the default TC link key) and is authenticated by the TC.

At an optional step S411, the CT unicasts a simple descriptor request (Simple_desc_req) to the new device in order to retrieve and store information for binding.

Again, at step S412, the joiner is active in the network and the procedure ends.

Figure 5:
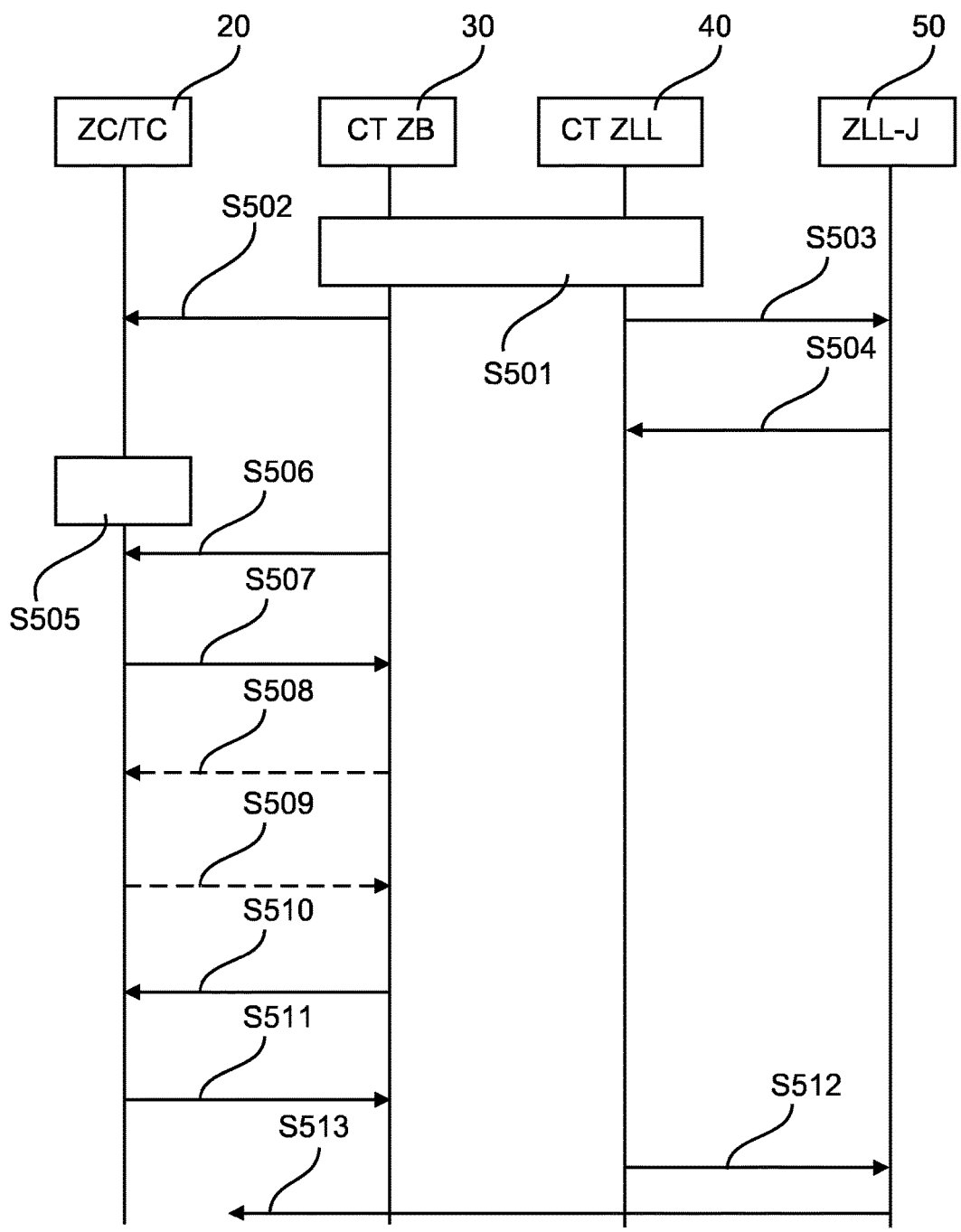
FIG. 5 shows a signaling diagram of a commissioning procedure according to a third embodiment where the commissioning tool operates as a commissioning time gateway.

FIG. 5 shows a signaling diagram of a commissioning procedure according to a third embodiment where the CT operates as a commissioning time gateway. To achieve this, the CT provides a ZigBee (ZB) functionality 30 and a ZLL functionality 40 which are adapted to provide a link between the different profiles to enable commissioning at step S501. Preferably, the CT can ask the ZC/TC 20 for approval prior to sending the parameters, esp. the network key, via ZLL Touchlink, to the joiner device 50. At step S502 the CT ZB functionality 30 transmits a PermitJoin=TRUE information to the ZC/TC 20 and the ZC/TC 20 enables commissioning in at step S505. At step S503, the CT touchlink functionality 40 transmits a touchlink scan request to a ZLL joiner (ZLL-J) 50 and receives a touchlink scan response at step S504. Next, the CT ZB functionality 30 transmits a beacon request to the ZC/TC 20 at step S506 and receives a beacon from the ZC/TC 20 at step S507.

Optionally, the CT ZB functionality 30 may transmit a MAC association request for a joiner to the ZC/TC 20 at step S508 and may receive a MAC association response at step S509, the input for the device capabilities is based on the TL scan exchange.

Then, the CT ZB functionality 30 may transmit a update device request for a joiner to the ZC/TC 20 at step S510 and may receive a transport key for the joiner at step S511. Based on this transport key, the CT ZLL functionality 40 can transmit a ZLL network join request to the ZLL joiner 50 at step S512. Finally, at step S513, the ZLL joiner can issue a NWK rejoin request towards the ZHA domain.

For ZHA devices, the CT can facilitate the classical commissioning, e.g. enable PermitJoin signaling, etc.

In case where the CT works within a centralized network (i.e. there is already a coordinator) and a new touchlink-enabled device wants to join the network; the CT may consult the ZC/TC before accepting the joiner. In a centralized network run by a TC, the CT works as an intermediary, i.e. it translates the ZLL Touchlink communication into ZHA (classical joining/EZ-Mode) commissioning communication, such that the TC "thinks" the joiner is a regular ZHA device—and the joiner "thinks" it is participating in a regular ZLL exchange. In order to keep both sessions alive, the CT must be aware of timing in both protocols. Most notably, this way the CT can consult the ZC/TC before delivering the network key to the joiner, so the ZC/TC can still remain the central control point for network extensions, while the simplicity of the ZLL exchange is kept for the user.

Furthermore, the CT (especially if realized as a temporarily-powered device, esp. ZED, e.g. RC) can instruct a router to (re)join the network by stopping to send any replies to the joiner after providing the joiner with the network parameters in the touchlink network join router/end device request, i.e. for the ZigBee association/joining phase. This behaviour would force the joiner to pick up another device as a parent within the network. If the joiner uses NWK rejoin procedure, this can be done even without enabling PermitJoin signaling on the other parent.

Figure 6:
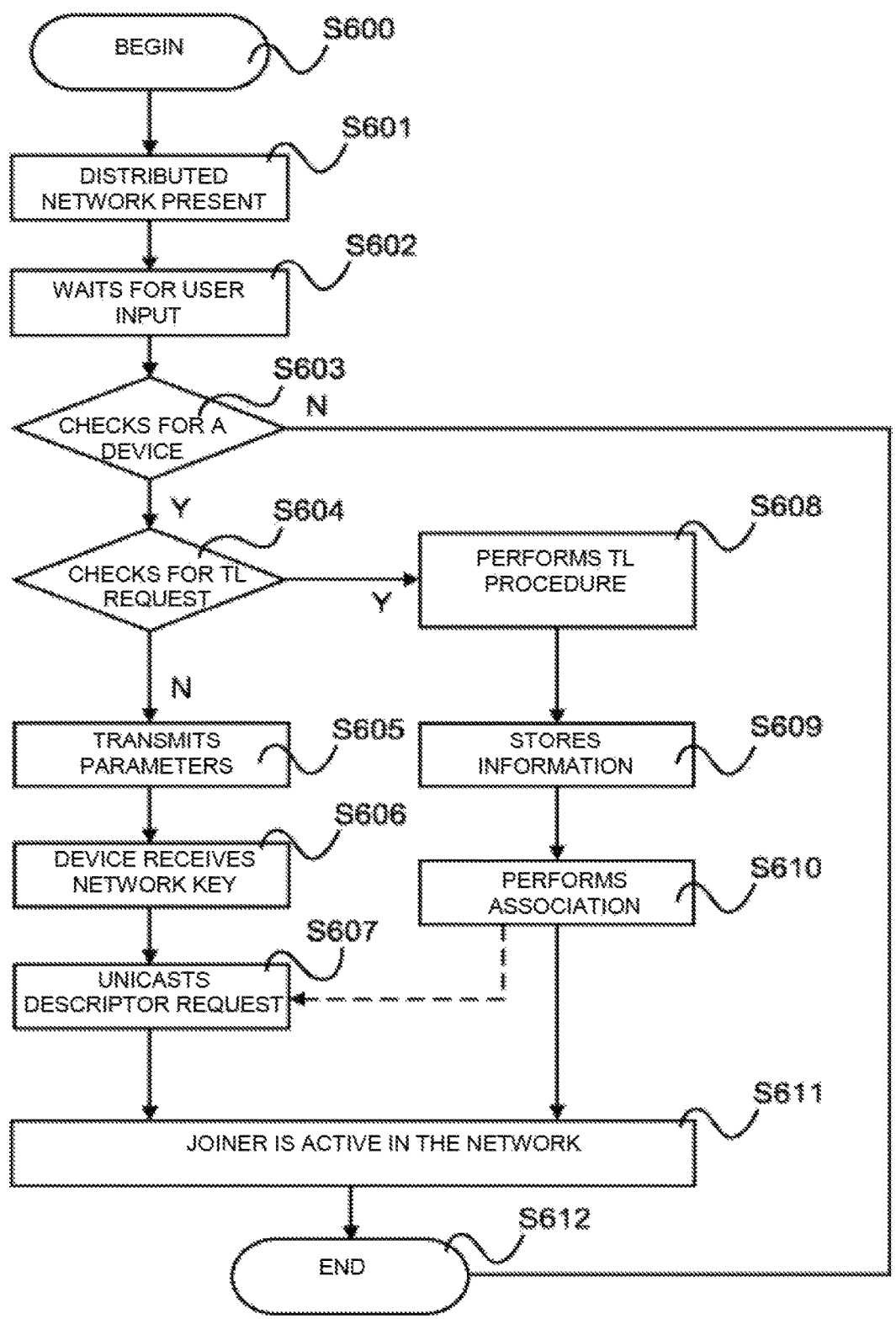
FIG. 6 shows a flow diagram of a commissioning procedure according to a fourth embodiment where the commissioning tool works within a distributed network and a new device wants to join the network.

FIG. 6 shows a flow diagram of a commissioning procedure according to a fourth embodiment where the CT works within a distributed network and a new device wants to join the network.

Here, the CT acts as a parent for ZHA devices providing them with his address as TC address and it also works as a ZLL initiator towards the ZLL devices. This may lead to a mixed network configuration, with some devices "beliving" to be on a distributed network, and some "beliving" to be on a centralized network; with their network settings differing by the TC address stored (equal or not equal to "0xff . . . ff", respectively) and the way of delivery of the network key (by parent/TC, respectively, and the key typed used for network key protection). In this case, every time a new device needs to be added to the network the CT needs to be switched on and operative in the network. However, the CT is not necessarily a parent itself, if the joiner (which requires TC presence) can join at one of the devices configured with the TC address (other than "0xff . . . ff"). The CT may also become the parent for the joiner for the time of network parameters delivery, and then let it rejoin (preferably using secured NWK rejoin) at any router.

The procedure of FIG. 6 starts at step S600 and a distributed network is present at step S601. From step S602 to step S604 the procedure recalls the same steps described in connection with FIGS. 3 and 4.

At step S605, in case no Touchlink request has been detected at step S604, as part of the classical joining/EZ-Mode (association) procedure the TC transmits current network parameters (e.g. EPID, PID and network address).

At step S606 the network key secured with a TC-default key is transmitted to the joiner as part of the transport key command, also including CT's own address as TC address.

At an optional step S607, the CT unicasts a simple description request (Simple_desc_req) to the new devices and stores the retrieved information in its memory.

Otherwise, if at step S604 a Touchlink request has been detected, the procedure branches to step S608 and the joiner performs a Touchlink procedure as described in the ZLL ZigBee specification. Thereby, it receives the network key secured with ZLL key. The CT, at an optional step S609 stores information exchanged during the Touchlink procedure in its own memory. At step S610, the joiner can perform association or NWK-rejoin with the obtained parameters.

Finally, at step S611, the joiner device is active and operative in the network and the procedure ends.

In the following, the security key exchange will be described in more detail.

The ability of the CT to commission both ZLL and ZHA devices, requires that the CT is provided with the appropriate security keys, in order to perform the authentication and deliver the network key in accordance with each profile specification.

In particular, the CT is provided with three different keys: a ZLL master key, a well-known default TC link key, and a ZLL pre-installed certification link key. As further option, the CT may include other key types, e.g. individual TC link key resulting from installation codes. The ZLL key is a secret shared by all certified ZLL devices. It is distributed only to certified manufacturers and is bound with a safe-keeping contract. The commissioning tool must therefore be certified as ZLL device and it is intended to deliver the network key (NWK) protected by the ZLL key only to devices that are ZigBee Light Link compliant.

Although the ZLL pre-installed key is not involved in any of the described embodiments of the present invention, it is considered as a necessary key in order to guarantee that the CT is a ZLL compliant device and eligible for ZLL certification. It may be used for delivering the network key to touchlink-capable devices using classical commissioning.

For all ZHA devices, and others ZigBee Pro devices which do not support a pre-installed key the presence of the ZLL key is transparent.

In one embodiment, the user, thanks to the presence of the ZigBee application profile logo on each ZigBee certified device, is aware of the capability of the device that needs to be commissioned (i.e ZHA, ZLL), and instructs the CT (e.g. press a button on the CT) accordingly. Indicating the profile to which the device belongs to, the CT is made aware of which security key will be used to safely transport the network key.

In another embodiment, the key type to use is determined upon discovering the capabilities of the joiner, e.g. based on the commissioning method used by it (EZ-Mode vs. ZLL Touchlink).

Analogously to ZLL and ZHA networks, the CT may bridge between other security modalities, e.g. IC-capable joiners and non-IC-capable networks.

Another difference that today prevents from successful communication between ZHA and ZLL is the different time duration for which a device may allow another device to join the network and the incapability of ZLL device to broadcast a management permit join request (Mgmt-Permit-Join request) to enable a permit duration flag.

For keeping consistency of data and allowing devices from different profiles to join a network, the commissioning tool has the ability to unicast/broadcast the command Mgmt_Permit_Join with a permit duration parameter set to the length of time in seconds during which the ZigBee coordinator or router will allow associations (usually 180 s). When a device in the network receives the Mgmt_Permit_Join request command, it is able to process this command and issue a NLME_Permit_Join request using the same permit duration value supplied in the Mgmt_Permit_Join request of the CT.

As additional feature, the CT may have the ability to broadcast the Device_annce command to notify other ZigBee devices that a new device has joined the network or a device which lost the connection has successfully performed a re-join procedure.

Once a device is in the network, it is necessary to establish a relationship with its controlling applications and/or the applications it will control. The process used to establish a logical relationship between two endpoints located in different devices is called in ZigBee a binding (a switch that controls a light is bound to the light, for instance), and may include the formation of control groups; the finding part refers to selecting the device(s) to bind to from possibly many devices with matching functionality. An entry in the binding table is essentially a pair that consists of an association between source address, source endpoint identity (ID), destination address, destination endpoint ID and the cluster identifier used in the binding link. The binding table is stored by the source device supporting classical commissioning/EZ-Mode, and it is externally readable (via Mgmt_Bind_req) and configurable (via Bind_req/Unbind_req). ZLL has a similar structure at the application level, which however is not externally accessible.

With this purpose, the CT may have bridge functionality in binding devices within a network; in particular it is able to act as the other side of a binding.

In various embodiments, the CT can do the device and service discovery in real time, across both commissioning modalities, searching for the devices matching the application functionality of the actual joiner the CT proxies for. It may translate the requests/responses of the joiner (e.g. the Match descriptor request of a ZHA joiner; including translating between different ZigBee device and service discovery services, if only some are supported, e.g. respond to a matching descriptor request (Match_Desc_req), based on the ZigBee simple descriptor request (Simple_Desc_req) or generate requests/responses based on the information obtained before (e.g. in the touchlink scan response message of the ZLL joiner). Further, it may adapt the profile identifier in the device and service discovery messages, so that it matches the profile expected by the requester. For that, the CT may generate or re-send the requests and/or responses with the appropriate profile identifier. It may thus mediate between the devices for them to self-create their own application-layer control relationships (e.g. bindings), or configure those relationships explicitly (e.g. using the binding request command of ZigBee). It is to be noted that this may require sending ZLL commissioning cluster commands (e.g. device information request or scan request) over the (protected) ZigBee network, rather than the Inter-PAN.

In other embodiments, once the CT is active in the network it collects the information related to the other device already in the network. This may be beneficial e.g., if the devices are not always on the network, or e.g. if the ZLL device gets out of CT's Touchlink proximity range, preventing subsequent delivery. To achieve this, it will first send a device information request command of the ZLL commissioning cluster (over ZigBee or Inter-PAN) and/or ZigBee device and service discovery commands in order to retrieve information from both ZLL and ZHA devices. The CT, in fact, supports both EZ-Mode and Touchlink (Inter-PAN messaging) and implements an internal data structure able to store the information about the devices in the network. In a similar way, when a new device will join the network, after the exchange of the security key the CT will collect and store the information related to the new device in its own memory. The format of the stored information may depend on the type of device involved in the commissioning. In particular, in case of a ZLL device commissioned via TouchLink, the CT may record the related information in a device information table with the following format:

| Field Name | Data type |
|---|---|
| IEEE address | IEEE address |
| EndPoint ID | Unsigned 8-bit integer |
| Profile ID | Unsigned 16-bit integer |
| Device ID | Unsigned 16-bit integer |
| Device version | Unsigned 4-bit integer |
| Reserved | (4 bits) |
| # of group ID | Unsigned 8-bit integer |
| sort tag | Unsigned 8-bit integer |

In case of a ZHA device commissioned via EZ-mode or classical commissioning, the stored information consists of the fields of the simple descriptor which has the following format:

| Field Name | Length (Bits) |
|---|---|
| Endpoint | 8 |
| Application profile identifier | 16 |
| Application device identifier | 16 |
| Application device version | 4 |
| Reserved | 4 |
| Application input cluster count | 8 |
| Application input cluster list | 16 * i (where i is the value of the application input cluster count) |
| Application output cluster count | 8 |
| Application output cluster list | 16 * o (where o is the value of the application output cluster count) |

This information will be kept in memory only during the whole commissioning phase. Once the new device is in the network and has reached its normal operational state, the CT can refresh or drop the information stored in the memory.

In one embodiment, to initiate the binding procedure, upon a trigger (i.e. the user presses the binding button installed on the source endpoint device, or automatically following the device joining), the source endpoint device triggers device and service discovery, which in turn triggers the CT to retrieve information related to the device capability of the source endpoint device. As discussed above, this retrieval can be from local memory, based on CT's pre-discovery, or real-time from the remote device itself (or another cache). Also, the retrieval of the application information from the local memory can be complemented by real-time checking of the devices currently selected by the user for commissioning, e.g. via checking their identifying status.

After receiving device capability from both source and destination (using EZ-mode or via Touchlink modality depending on the ZigBee profile of the device), the CT compares their supported cluster identifiers, and if they match, it validates the binding request and all the information about the binding is stored in an internal binding table. It is to be noted that the step of comparing the supported cluster identifiers may require translating the ZLL functionality (as encoded by the device identifier and version fields of e.g. the ZLL commissioning cluster scan request/response command). Mandatory device functionality as defined in the ZLL specification can be used for that purpose.

The table below lists an exemplary definition for a ZLL dimmable lighting device.

| Dimmable light [Device ID: 0x0100] | |
|---|---|
| Server clusters | Client clusters |
| Identify | — |
| Groups | |
| Scenes | |
| On/off | |
| Level control | |

Figure 7:
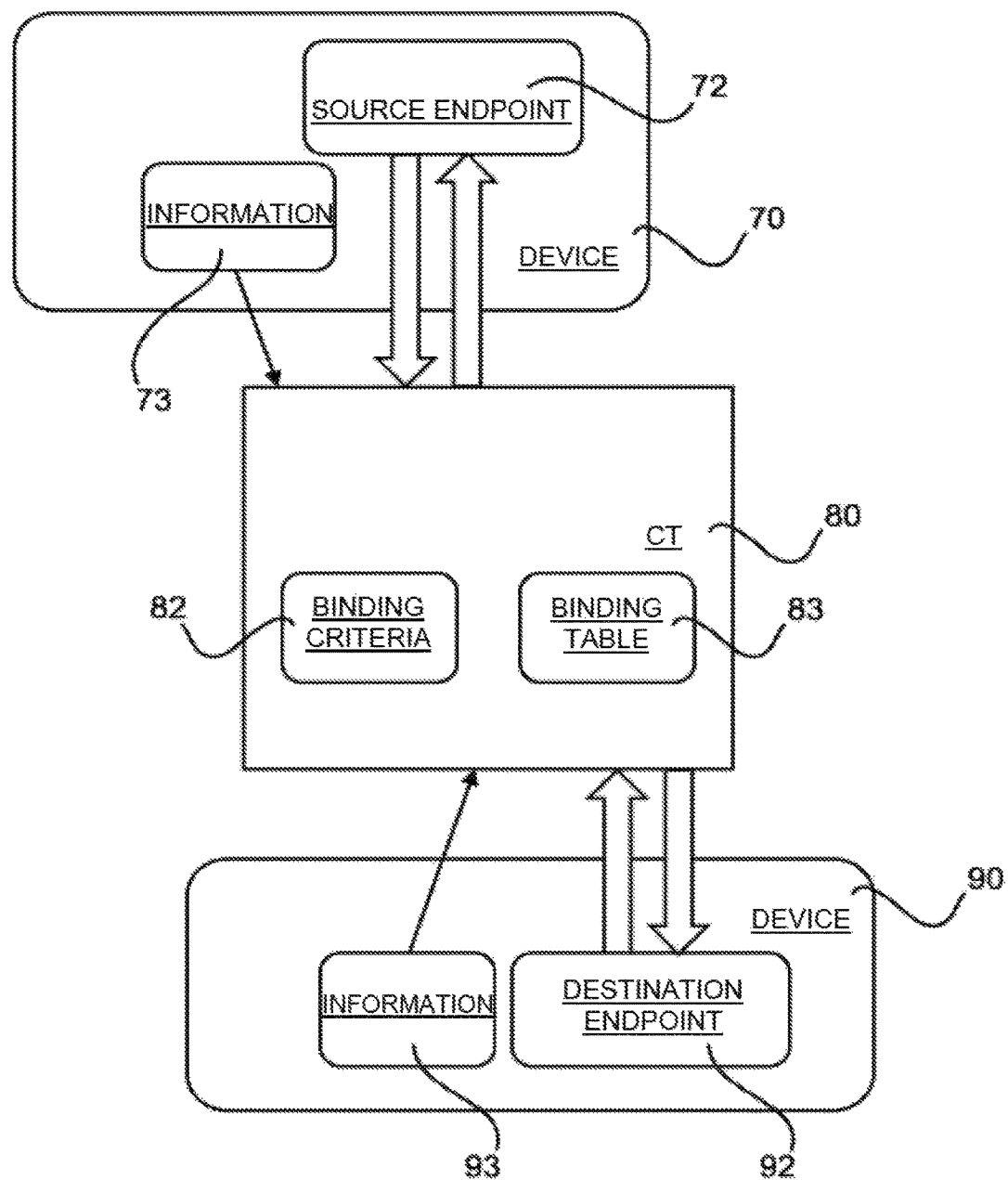
FIG. 7 shows a schematic block diagram of a commissioning device according to various embodiments which a proxy functionality between different network devices.

FIG. 7 shows a schematic block diagram of a CT according to various embodiments which a proxy functionality between different network devices. According to FIG. 7, the CT 80 first communicates with a source endpoint 72 of a first device 70 (e.g. server device) getting its device capability and information 73. The CT 80 then communicates with a destination endpoint 92 of a second device 90 (e.g. client device) to get its device capability and information 93. The CT 80 then does the matching according to its binding criteria 82. If the matching correct, then a configuring command is sent to both devices, according to the modality supported by each of them and a new binding entry is stored in a binding table 83 of the CT 80 as the central device.

As for the binding process, it is important to highlight two different use cases. First, a ZHA controller (e.g. sensor, switch, etc.) which wants to control a ZLL bulb. Second, a ZLL controller (e.g. sensor, switch, etc.) which wants to control a ZHA bulb.

Figure 8:
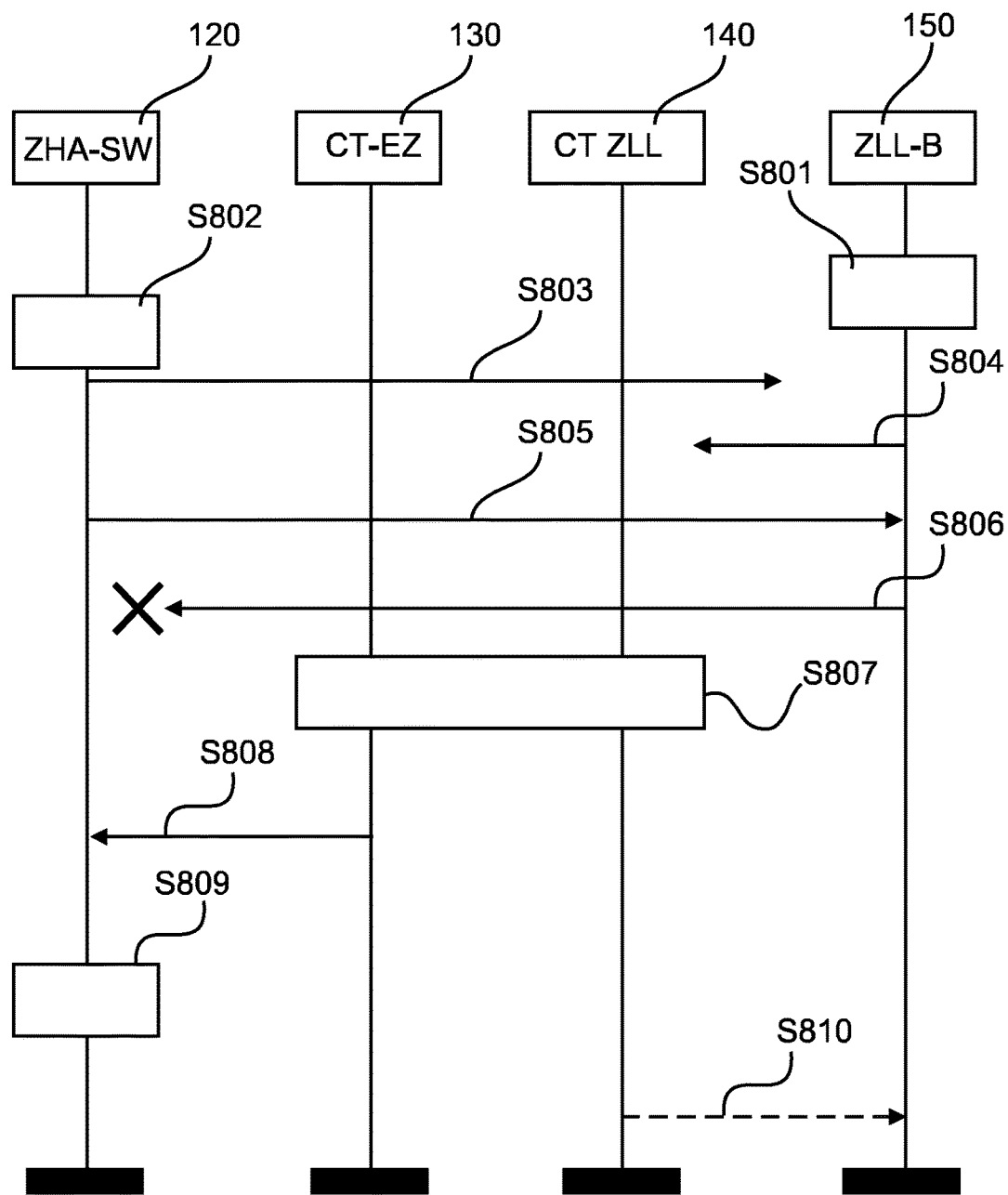
FIG. 8 shows a signaling diagram of a binding procedure according to a fifth embodiment for devices with different profiles.

FIG. 8 shows a signaling diagram of a binding procedure according to a fifth embodiment for devices with different profiles and for the above first use case. In reference to the fifth embodiment which relates to the first case of a ZHA controller (ZHA-SW) 120 which controls a ZLL bulb (ZLL-B) 150, once the ZLL bulb 150 and the ZHA switch 120 devices are successfully operating on the same network (either because the CT has created a network or has allowed the devices to join an existing network, as described in the first section of creation/joining/discovery of a network), the binding procedure may not (need to) involve the usage of CT with its EZ mode functionality 130 and ZLL functionality 140. In this case, the information necessary to the ZHA switch to perform the binding can be retrieved directly by unicasting the simple descriptor request (Simple_Desc_req) or matching descriptor request (Match_Desc_req) to the ZLL bulb 150.

The signaling diagram of FIG. 8 relates to a case where the CT may still be required, e.g. to put a correct profile ID in the response provided by the ZLL device, i.e. profile ID X (e.g. "0x0104") instead of profile ID Y (e.g. "0xc05e). At step S801, an action is initiated (e.g. by a user or another trigger) to put the ZLL bulb 150 into a identify mode. At step S802, the ZHA switch 120 is controlled to enable the EZ mode. At step S803, the ZHA switch 120 broadcasts an identify query command and at step S804 the ZLL bulb 150 broadcasts an identify query response. Then, at step S805, the ZHA switch 120 transmits a simple descriptor request (or another attempt to retrieve endpoint information or a matching descriptor) with its profile ID X to the ZLL bulb 150. In response thereto, at step S806, the ZLL bulb 150 issues a response with its profile ID Y, which gets lost due to the non-matching profile IDs. Now, at step S807, the CT provides a translation function between its ZLL functionality 140 and its EZ functionality 130 so as to translate the profile ID Y received from the ZLL bulb 150 into the correct profile ID X of the ZHA switch 120. Then, in step S808, the EZ functionality 130 forwards the response with the translated profile ID to the ZHA switch 120. Having received the correct profile ID X, the ZHA switch 120 initiates a local binding creation at step S809. Optionally, the ZLL functionality 140 of the CT may send a stop identify command to the ZLL bulb 150 at step S810.

Figure 9:
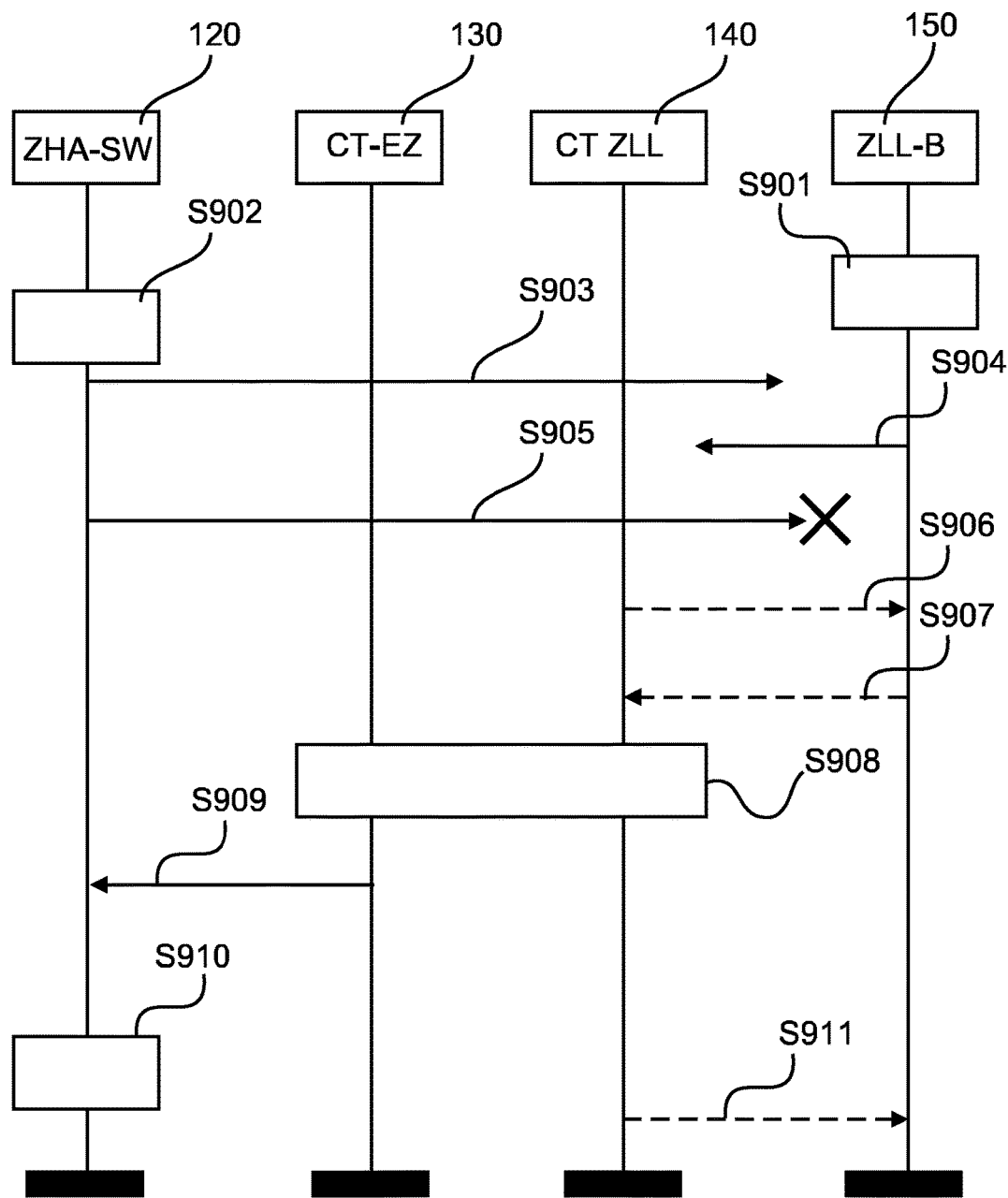
FIG. 9 shows a signaling diagram of a binding procedure according to a sixth embodiment for devices with different profiles, where the commissioning tool translates a profile identity.

FIG. 9 shows a signaling diagram of a binding procedure according to a sixth embodiment for devices with different profiles and for the above first use case, where the commissioning tool translates between different device and service discovery methods according to different commissioning methods.

Here, the CT may translate the information obtained via Touchlink mechanisms from the ZLL bulb 150 to the ZigBee device and service primitives used by the ZHA switch 120. The latter may be required, e.g. if the ZLL bulb 150 is temporarily unavailable, e.g. still re-joining, etc.

In the signaling diagram of FIG. 9, steps S901 to S904 correspond to steps S801 to S804 of FIG. 8. Then, at step S905, the ZHA switch 120 transmits a simple descriptor request (or another attempt to retrieve endpoint information or a matching descriptor) to the ZLL bulb 150 which gets lost. Now, at step S906, the ZLL functionality 140 of the CT sends an optional Inter-PAN device information request to the ZLL bulb 150 which responds at step S907 with an Inter-PAN device information response. Alternatively to step S906 and S907, the CT can retrieve the earlier obtained device information on the ZLL bulb from the local memory. The bulb information is then translated at step S908 in the CT and forwarded by the EZ functionality 130 in a simple descriptor response with the translated bulb information to the ZHA switch 120. Having received the translated bulb information, the ZHA switch 120 initiates a local binding creation at step S910. Optionally, the ZLL functionality 140 of the CT may send a stop identify command to the ZLL bulb 150 at step S911.

Figure 10:
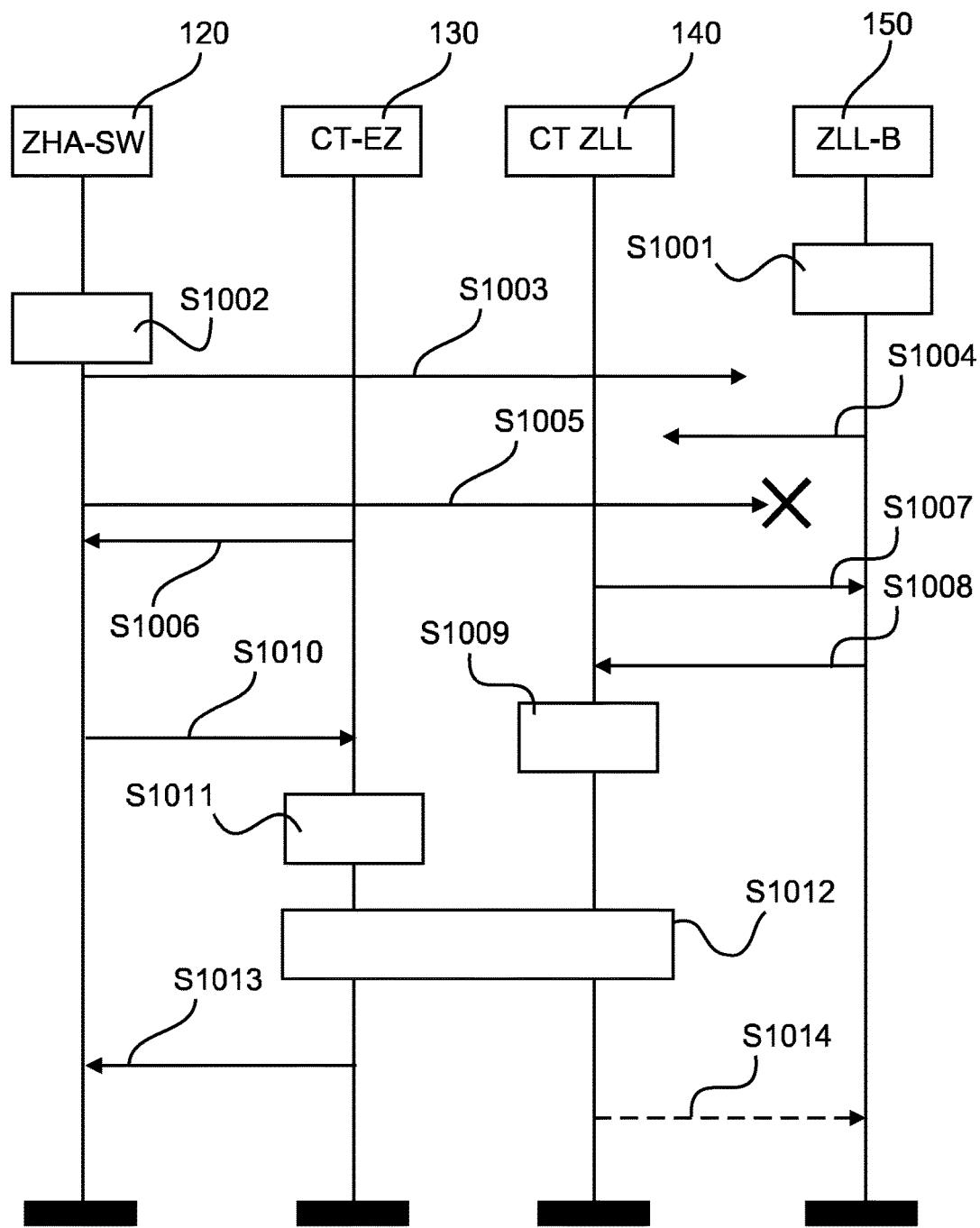
FIG. 10 shows a signaling diagram of a binding procedure according to a seventh embodiment for devices with different profiles, where the commissioning tool creates the binding.

FIG. 10 shows a signaling diagram of a binding procedure according to a seventh embodiment for devices with different profiles and for the above first use case, where the commissioning tool creates the binding.

To know which ZLL devices to pair the ZHA switch 120 to, the CT may need to query (and/or store) their identify status, monitor the time elapsed since joining, etc. In the seventh embodiment, the CT—rather than translating the request/response, may locally compare the application capabilities of both devices, and directly configure bindings on the ZHA switch 120, e.g. using a binding request. Care must be taken that this is a valid outcome of the EZ-Mode commissioning procedure, i.e. that the state machine does not hang/fail the process due to missing discovery responses, while the bindings are configured already.

The initial steps S1001 to S1005, S1007 and S1008 correspond to steps S901 to S907 of FIG. 9 and are not explained again here. However, contrary to the sixth embodiment, the EZ side or functionality 130 of the CT now also sends a simple descriptor request to the ZHA switch 120 at step S1006. At step S1009, the bulb information received from the ZLL bulb 150 is stored at the CT. Furthermore, at step S1010, the EZ functionality 130 of the CT receives switch information from the ZHA switch 120. This switch information is stored at the CT at step S1011. Then, at step S1012, the stored bulb information is compared with the stored switch information to identify matches. Based on the result of comparison, the EZ functionality 130 of the CT transmits a ZigBee Application Support Sub-Layer (APS) binding request to the ZHA switch 120 at step S1013. Optionally, the ZLL functionality 140 of the CT may send a stop identify command to the ZLL bulb 150 at step S1014.

Contrary to the above first use case of FIGS. 8 to 10, the second use case of a ZLL switch which controls a ZHA bulb requires the CT to overcome the lack of source binding in the ZLL controller and the lack of ZLL commissioning cluster support on the ZHA bulb.

Figure 11:
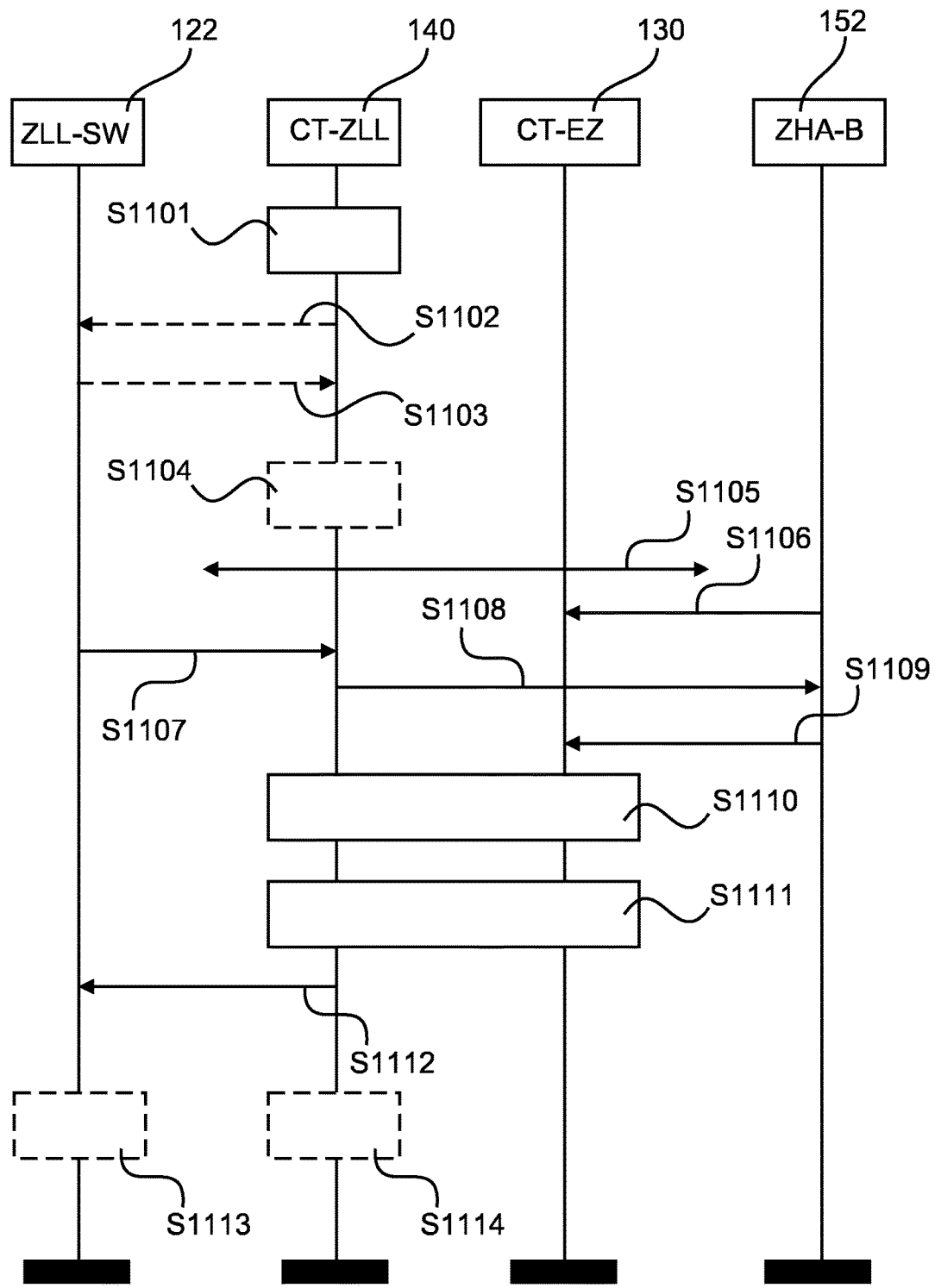
FIG. 11 shows a signaling diagram of a binding procedure according to an eighth embodiment for devices with different profiles.

FIG. 11 shows a signaling diagram of a binding procedure according to an eighth embodiment for devices with different profiles and for the above second use case.

The signaling diagram of FIG. 11 shows messages exchanged over the air between a ZLL controller (switch) 122, the CT (for descriptive purpose subdivided in two sub-entities CT-ZLL 140 and CT-EZ 130, as in FIGS. 8 to 10) and a ZHA bulb 152, in order to successfully bind the devices.

It is assumed that the ZLL switch 122, the CT and the ZHA bulb 152 have successfully joined, and are currently operative in the same network. At step S1101, an enabling binding step at the CT-ZLL side or functionality 140 could be triggered e.g. by a successful joining procedure of the ZLL switch 122 or the ZHA bulb 152 to the network or an explicit user action on the CT (e.g. by an input user interface). Alternatively, a reception of a particular device or service discovery message, over ZigBee and/or Inter-PAN, can be the trigger.

The procedure may further include the optional step (not shown) of user selecting the devices to bind, e.g. by enabling the identify mode on them. This selection may be implicit and automatically follow successful joining, may require user interaction with the device (e.g. pressing a button), or may be triggered by a command from the CT, e.g. when in proximity to the device to be selected (using Inter-PAN), or e.g. just toggling through all devices stored/discovered.

The CT may have already retrieved the information related to the ZLL switch 122 and/or the ZHA bulb 152 at the joining phase. Therefore, this information may be already available in its memory.

In FIG. 11, optional steps S1102 and S1103 related to the request of information from the ZLL switch by sending a device information request and receiving a device information response. The received switch information may be stored in a further optional step S1104. Furthermore, at step S1105 an identify query command may be broadcast from the CT to the ZHA bulb 152 and the ZLL switch 122. Both may respond with identity query responses at steps S1106 and S1107, respectively. Then, a simple descriptor or matching descriptor request is unicast to the ZHA bulb 152 at step S1108. The ZHA bulb S152 responds at step S1109 with a unicast simple descriptor or matching descriptor response including bulb information. Then, at step S1110, the CT may compare the received bulb information and switch information and translate the information at step S1111 based on the result of comparison. Then, at step S1112 the ZLL functionality 140 of the CT sends a commission cluster command to the ZLL switch 122. Optionally, the ZLL switch 122 may then initiate a pairing process and the ZLL functionality 140 may store the pairing information.

The exact moment in which the CT collects the information from the involved devices and the action which triggers this procedure can be implementation specific. The step S1110 of comparing the information for matches can be skipped, and the translated ZHA capability information of the ZHA bulb 152 can be delivered to the ZLL switch 122, so that it can perform the matching.

Instead of assisting in the creation of binding entries at the devices, the CT may perform the task of keeping and maintaining this information also for all the devices that do not have the capability to have a binding table and that do not support source binding, or which binding structures are not remotely accessible. However, this design has the implication that the CT needs to be operational whenever the communication between the bound devices takes place. Also, it is important to note that the source devices need to know to forward the communication to the CT (rather than silently dropping it due to no local storage of the destination). On the positive side, this design has the benefit of being able to correct some parameters when forwarding the commands to the device of the other profile, e.g. replace the profile ID (if mismatching profile identifiers are used) and/or e.g. replace a non-supported command by a supported equivalent (e.g. an enhanced add scene command by a regular add scene command or e.g. Off with effect command by a regular Off command).

It is to be noted, that if the CT is pretending to send a message on behalf of another device (be it ZLL joiner, CT, etc.), then it may need to put this device's address in the required fields, e.g. NWK source address field. It may also need to use other parameters related to the other device, e.g. its key, security frame counters, etc.

In the above embodiments, the CT is provided with at least one of the abilities to unicast the simple descriptor request ZigBee Device Object (ZDO) command to inquire the simple descriptor of a remote device on a specified endpoint, to provide discovery information of other devices upon reception of a simple descriptor request command from a local device, wishing to inquire the information of a remote device in the network whose info are kept in the commissioning tool memory (i.e. ZigBee cache functionality), to broadcast an identify query command, to handle an identify query response from an endpoint, to notify to other nodes in the network about the successful joining of a new device (e.g. by means of update device and/or device_annce commands), to notify the TC in the network about the information capability of a device that has joined the network by means of Touchlink with the commissioning tool itself (e.g. by means of update device and/or device_annce commands), to process a re-join request command and issue a re-join response command for allowing re-association of devices who lost connectivity to the network, to notify the user (e.g. via a buzzer and/or flashing LEDs) about the successful or unsuccessful accomplishment of a commissioning operation, and to keep track of the modality used to commission a device and to maintain this information for allowing an easier re-join procedure in case of connectivity loss. It is noted that the CT can be—depending on the actual realisation—implemented as ZC, ZR or ZED. If implemented as a ZED or ZR it may only pretend to be ZC towards the ZHA (legacy) joiners.

To summarize, a commissioning apparatus and method have been described for configuring a joining node of a first profile for operation in a network in accordance with a second profile, wherein the commissioning apparatus is arranged to emulate a commissioning process corresponding to the first profile.

The described operations of the components of the network system according to various embodiments can be implemented as program code means of a computer program and/or as dedicated hardware. More specifically, the described procedures can be implemented as program code means of a computer program and/or as dedicated hardware. The computer program may be stored and/or distributed on a suitable medium, such as an optical storage medium or a solid-state medium, supplied together with or as part of other hardware, but may also be distributed in other forms, such as via the Internet or other wired or wireless telecommunication systems.

While the invention has been illustrated and described in detail in the drawings and foregoing description, such illustration and description are to be considered illustrative or exemplary and not restrictive. The invention is not limited to the disclosed embodiment with the bulb as load device. It can be implemented in connection with any type loads, sensors, switches and the like.

Other variations to the disclosed embodiments can be understood and effected by those skilled in the art in practicing the claimed invention, from a study of the drawings, the disclosure and the appended claims. In the claims, the word "comprising" does not exclude other elements or steps, and the indefinite article "a" or "an" does not exclude a plurality. A single processor or other unit may fulfil the functions of several items recited in the claims. The mere fact that certain measures are recited in mutually different dependent claims does not indicate that a combination of these measures cannot be used to advantage.

The foregoing description details certain embodiments of the invention. It will be appreciated, however, that no matter how detailed the foregoing appears in text, the invention may be practiced in many ways, and is therefore not limited to the embodiments disclosed. It should be noted that the use of particular terminology when describing certain features or aspects of the invention should not be taken to imply that the terminology is being re-defined herein to be restricted to include any specific characteristics of the features or aspects of the invention with which that terminology is associated.

A single unit or device may fulfill the functions of several items recited in the claims. The mere fact that certain measures are recited in mutually different dependent claims does not indicate that a combination of these measures cannot be used to advantage.

The invention claimed is:

1. A commissioning apparatus for configuring a non-connected node to operate within a network comprising further nodes, the non-connected node configured to exchange parameters according to a first commissioning process defined in a first application profile, the further nodes configured to exchange parameters according to a second commissioning process defined in a second application profile, different from and incompatible with the first commissioning process, the commissioning apparatus comprising:
   a transceiver configured to receive information, from the non-connected node, regarding the non-connected node; and
   a controller configured to process the information for implementing at least one commissioning procedure corresponding to the first application profile, thereby enabling the non-connected node to operate within the network using the first commissioning process although the network operates in accordance with the second commissioning process,
   wherein the commissioning apparatus is configured: to allow devices comprising ZigBee Light Link, ZLL, devices to join the network according to a Touchlink commissioning process, to operate as an initiator, to copy centralized network parameters, and to reinterpret the centralized network parameters within a command comprising a ZLL commissioning cluster command, and wherein the transceiver is configured to communicate with a device comprising a trust center device, about the non-connected device, to request approval prior to sending the centralized network parameters or a network key.

2. The commissioning apparatus of claim 1, wherein the first application profile is selected based on at least one of the following: a user selection, detection, abilities of the non-connected node discovered by the commissioning apparatus.

3. The commissioning apparatus of claim 1, wherein the commissioning apparatus is configured to attempt a plurality of supported commissioning methods in a predetermined order.

4. The commissioning apparatus of claim 1, wherein the commissioning apparatus is configured to translate ZigBee Light Link Touchlink communication into ZigBee commissioning communication.

5. The commissioning apparatus of claim 1, further comprising a processor for translating requests or responses of the non-connected node from a protocol of the first application profile to a protocol of the second application profile or for generating requests or responses based on information obtained before.

6. The commissioning apparatus of claim 1, wherein the commissioning apparatus is configured to provide a first functionality for devices of the first application profile and a second functionality for devices of the second application profile, and wherein the commissioning apparatus is configured to determine capabilities of the non-connected node and to select an appropriate commissioning method based on a result of the determined capabilities.

7. The commissioning apparatus of claim 6, wherein the commissioning apparatus is configured to determine a security key based on a result of the determined capabilities.

8. The commissioning apparatus of claim 1, wherein the commissioning apparatus is configured, responsive to operating on a distributed network, to perform at least one function as a coordinator on a centralized network and to deliver a network key protected in accordance with an application profile for a ZigBee device.

9. The commissioning apparatus of claim 1, wherein the commissioning apparatus is configured to instruct a router device to join or rejoin the network by stopping to send any replies to the non-connected node.

10. The commissioning apparatus of claim 1, wherein the commissioning apparatus is configured to collect and store information about devices of the network in an internal data structure.

11. The commissioning apparatus of claim 1, wherein the commissioning apparatus is configured to perform at least one of unicasting a simple descriptor request ZDO command, of providing discovery information of other devices upon reception of a simple descriptor request command from a local device, of broadcasting an identify query command, of handling an identify query response from an endpoint, of notifying to other nodes in the network about the successful joining of a new device, of notifying a trust center in the network about information capability of a device that has joined the network by means of Touchlink commissioning, of processing a re-join request command and issuing a re-join response command for allowing re-association of devices which lost connectivity to the network, of notifying a user about successful or unsuccessful accomplishment of a commissioning operation, and of tracking a modality used to commission a device and maintaining this information for allowing a re-join procedure in case of a loss of connectivity.

12. A commissioning method for configuring a non-connected node to operate within a network comprising further nodes, the non-connected node configured to exchange parameters according to a first commissioning process defined in a first application profile, the further nodes configured to exchange parameters according to a second commissioning process defined in a second application profile, different from and incompatible with the first commissioning process, the method comprising the steps of:
   receiving, by a transceiver, information from the non-connected node;
   processing, by a controller, the information from the non-connected node to provide a commissioning function in the network; and
   performing the commissioning function corresponding to the first application profile, thereby enabling the non-connected node to operate within the network using the first commissioning process although the network operates in accordance with the second commissioning process,
   wherein performing the commissioning function comprises: allowing devices comprising ZigBee Light Link, ZLL, devices to join the network according to a Touchlink commissioning process, to operate as an initiator, to copy centralized network parameters, and to reinterpret the centralized network parameters within a command comprising a ZLL commissioning cluster command, and wherein the transceiver is configured to communicate with a device comprising a trust center device, about the non-connected device, to request approval prior to sending the centralized network parameters or a network key.

13. A network device comprising a commissioning apparatus for configuring a non-connected node to operate within a network comprising further nodes, the non-connected node configured to exchange parameters according to a first commissioning process defined in a first application profile, the further nodes configured to exchange parameters according to a second commissioning process defined in a second application profile, different from and incompatible with the first commissioning process, the commissioning apparatus comprising:
 a transceiver configured to receive information, from the non-connected node, regarding the non-connected node; and
 a controller configured to process the information for implementing at least one commissioning procedure corresponding to the first application profile, thereby enabling the non-connected node to operate within the network using the first commissioning process although the network operates in accordance with the second commissioning process,
 wherein the network device is configured: to allow devices comprising ZigBee Light Link, ZLL, devices to join the network according to a Touchlink commissioning process, to operate as an initiator, to copy centralized network parameters, and to reinterpret the centralized network parameters within a command comprising a ZLL commissioning cluster command, and wherein the transceiver is configured to communicate with a device comprising a trust center device, about the non-connected device, to request approval prior to sending the centralized network parameters or a network key.

14. A non-transitory computer readable medium comprising code that, when executed on a computing device, produce a commissioning method for configuring a non-connected node to operate within a network comprising further nodes, the non-connected node configured to exchange parameters according to a first commissioning process defined in a first application profile, the further nodes configured to exchange parameters according to a second commissioning process defined in a second application profile, different from and incompatible with the first commissioning process, the method comprising the steps of:
 receiving, by a transceiver, information from the non-connected node;
 processing, by a controller, the information from the non-connected node to provide a commissioning function in the network; and
 performing the commissioning function corresponding to the first application profile, thereby enabling the non-connected node to operate within the network using the first commissioning process although the network operates in accordance with the second commissioning process,
 wherein performing the commissioning function comprises: allowing devices comprising ZigBee Light Link, ZLL, devices to join the network according to a Touchlink commissioning process, to operate as an initiator, to copy centralized network parameters, and to reinterpret the centralized network parameters within a command comprising a ZLL commissioning cluster command, and wherein the transceiver is configured to communicate with a device comprising a trust center device, about the non-connected device, to request approval prior to sending the centralized network parameters or a network key.

* * * * *